(12) United States Patent
Workman

(10) Patent No.: US 9,366,359 B2
(45) Date of Patent: Jun. 14, 2016

(54) FLOAT APPARATUS

(71) Applicant: FlowTech Fueling, LLC, Moorcroft, WY (US)

(72) Inventor: Jeffrey D. Workman, Moorcroft, WY (US)

(73) Assignee: Flowtech Fueling, LLC, Moorcroft, WY (US)

( * ) Notice: Subject to any disclaimer, the term of this patent is extended or adjusted under 35 U.S.C. 154(b) by 104 days.

(21) Appl. No.: 14/187,944

(22) Filed: Feb. 24, 2014

(65) Prior Publication Data

US 2015/0240967 A1    Aug. 27, 2015

(51) Int. Cl.
*F16K 31/18*    (2006.01)
*F16K 31/30*    (2006.01)
*F16K 33/00*    (2006.01)

(52) U.S. Cl.
CPC .................. *F16K 31/30* (2013.01); *F16K 31/18* (2013.01); *F16K 33/00* (2013.01); *Y10T 137/7358* (2015.04); *Y10T 137/742* (2015.04); *Y10T 137/7423* (2015.04); *Y10T 137/7436* (2015.04); *Y10T 137/7769* (2015.04)

(58) Field of Classification Search
CPC ......... F16K 31/30; F16K 31/18; F16K 33/00; Y10T 137/7436; Y10T 137/7423; Y10T 137/7358; Y10T 137/742; Y10T 137/7769
USPC ......... 137/409, 410, 412, 413, 415, 428, 429, 137/433, 592
See application file for complete search history.

(56) References Cited

U.S. PATENT DOCUMENTS

| | | | |
|---|---|---|---|
| 5,172,714 A | 12/1992 | Kobayashi et al. | |
| 6,003,542 A * | 12/1999 | Pizzacalla | B67D 1/1247 137/210 |
| 7,793,682 B2 * | 9/2010 | Smit | 137/391 |
| 7,891,373 B2 | 2/2011 | Workman | |
| 2010/0224132 A1 | 9/2010 | Gauker et al. | |
| 2012/0048888 A1 * | 3/2012 | Pizzacella | F16K 11/07 222/144.5 |
| 2013/0228237 A1 | 9/2013 | Smit | |

FOREIGN PATENT DOCUMENTS

JP    09196226 A    7/1997

OTHER PUBLICATIONS

International Search Report for International Application No. PCT/US2015/016834 dated May 19, 2015 from Korean Intellectual Property Office.

* cited by examiner

*Primary Examiner* — John K Fristoe, Jr.
*Assistant Examiner* — Kelsey Rohman
(74) *Attorney, Agent, or Firm* — Holland & Hart LLP

(57) ABSTRACT

A float valve apparatus is provided for regulating the level of fluid within a tank. The apparatus may include a housing having one or more inlet ports and an outlet port that are each fluidly connected via a channel disposed within the housing. A float disposed within the housing may move relative to the housing between a first position and a second position when a fluid level in the tank reaches a preset level. A shaft may extend from the float into a chamber, and as the float moves from the first position to the second position, fluid may enter a chamber and bias the float further upward. In some examples, the shaft is further configured to increasingly obstruct the flow of fluid in the channel as the float moves from the first position to the second position.

18 Claims, 5 Drawing Sheets

FLOAT APPARATUS

FIELD

The present disclosure relates generally to systems and apparatus for protecting containers, such as fuel tanks on mobile equipment, against overfilling and/or over pressurization. More particularly, the present invention relates to an improved float for flow control valve systems.

BACKGROUND

To rapidly fill containers, such as the fuel tanks on mobile equipment, liquids may be pumped under relatively high pressures into the containers. In many pieces of heavy equipment, such as mining equipment, fuel tanks can hold a significant amount of fuel, resulting in a fueling operation that can be time consuming. Given the size of fuel tanks on such heavy equipment, high pressures are often used to reduce filling times. In some systems, a supply hose connected to the outlet of a pressure pump may be provided with a flow nozzle releasably connectable to a flow coupling on the container. Fuel may be provided through the supply hose to fill the container.

In order to prevent overfilling, the flow nozzles are commonly provided with shut-off valves to stop the flow of liquid to the container when back pressure indicates that the container is full. However, operators may manually override these shut-off valves, since it is common for the shut-off valves to "trip" before a container is full. With large equipment, such as mining equipment, it has been observed that where operators have manually overridden shut-off valves, pressure can build to the extent that fuel tanks bulge, and even rupture, resulting in safety and environmental incidents, as well as potentially costly loss of use and repair of the equipment.

SUMMARY

The described features generally relate to one or more improved systems and/or apparatuses for fluid flow control utilizing a flow control valve and associated float. In some aspects, a float valve apparatus is provided for regulating the level of fluid within a tank. The apparatus may include, in examples, a housing having one or more inlet ports and an outlet port that are each fluidly connected via a channel disposed within the housing. A float disposed within the housing may move relative to the housing between a first position and a second position when a fluid level in the tank reaches a preset level. A shaft connected to the float may have a distal end located in a chamber beneath the float, the chamber also fluidly connected to the channel. As the float moves from the first position to the second position, fluid may enter the chamber from the channel and pressurize the chamber to bias the float further upward. In some examples, the shaft is further configured to increasingly obstruct the flow of fluid in the channel as the float moves from the first position to the second position such that the shaft completely obstructs the flow of fluid in the channel when the float is in the second position. The obstructed flow may increase pressure at the fluid inlet, which may be coupled with a flow control valve to close the flow control valve.

Further scope of the applicability of the described systems and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for regulating the level of fluid within a tank using a float valve. The float valve may include a housing having one or more inlet ports and an outlet port that are each fluidly connected via a channel disposed within the housing. A float disposed within the housing may move relative to the housing between a first position and a second position when a fluid level in the tank reaches a preset level. A shaft may extend from the float into a chamber, and as the float moves from the first position to the second position, fluid may enter a chamber and bias the float further upward. In some examples, the shaft is further configured to increasingly obstruct the flow of fluid in the channel as the float moves from the first position to the second position.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the techniques described may be performed in an order different from that described, and various steps may be added, omitted, or combined. Also, features described with respect to certain examples may be combined in other examples.

Figure 1:
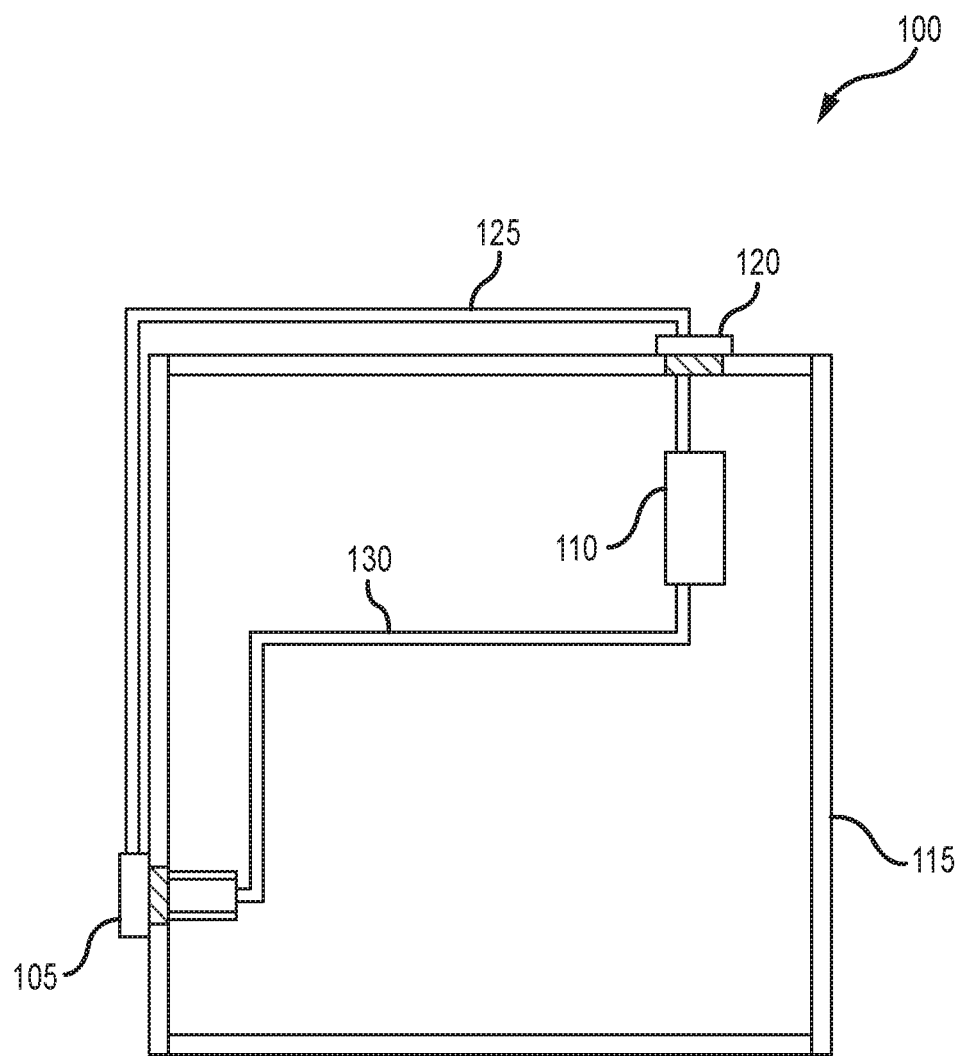
FIG. 1 shows a diagrammatic illustration of a fluid container and associated flow control system, according to various aspects of the disclosure.

Referring first to FIG. 1, a schematic view of a flow control system 100 is illustrated. The system 100 includes an inlet valve assembly 105 and a float valve assembly 110 installed on a tank 115. The tank may be, for example, a fuel tank on or for a piece of heavy machinery, such as mining or construction equipment. Inlet valve assembly 105 may be disposed directly in a wall of tank 115, as depicted or may be disposed at the inlet of a feed tube for such a tank, for example. Float valve assembly 110 may be disposed near an upper surface of the tank 115, situated at an appropriate depth to close the flow control valve system 100, as may be adjusted using mounting head 120. Tubing, such as a flexible hose, 125, 130 runs from float valve assembly 110 to inlet valve assembly 105. Tubing 130 may be internal to tank 115, and tubing 125 may be external to the tank 115. Tubing 125, 130 may provide a fluid connection between float valve assembly 110 and the inlet valve assembly 105, such that when the fuel level in the tank 115 rises to a certain level the inlet valve assembly 105 stops the flow of fuel into the tank 115. In some examples, a small portion of the fluid provided to the inlet valve assembly 105 travels through the tubing 125, 130 and enters the tank 115 through the float assembly 110. When the fuel level rises to the determined level, the float valve assembly 110 cuts off the flow of fluid through tubing 125, 130, which may increase the pressure in the tubing 125, 130 and cause a valve in the inlet valve assembly 105 to close, stopping the flow of fluid into the tank.

Figure 2:
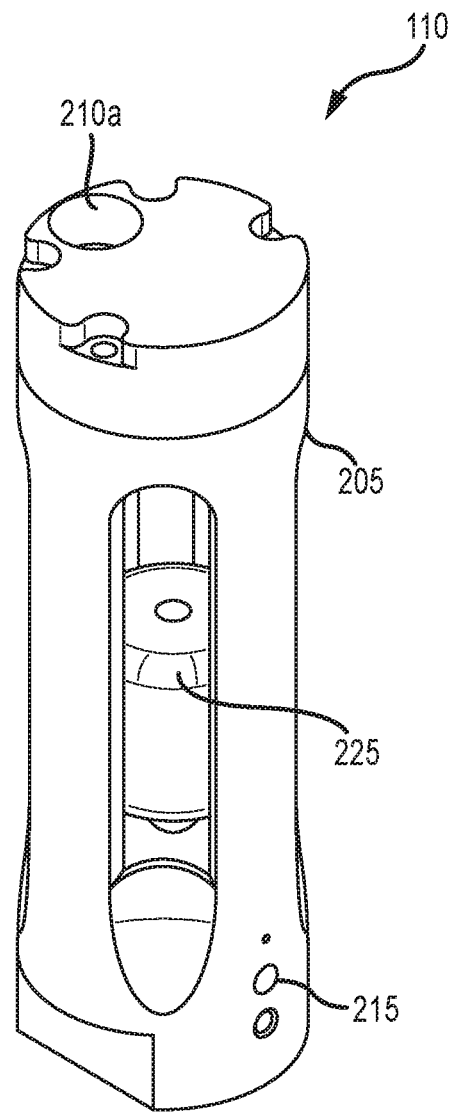
FIG. 2 shows a perspective view of a float valve assembly in accordance with various aspects of the disclosure.
Figure 3:
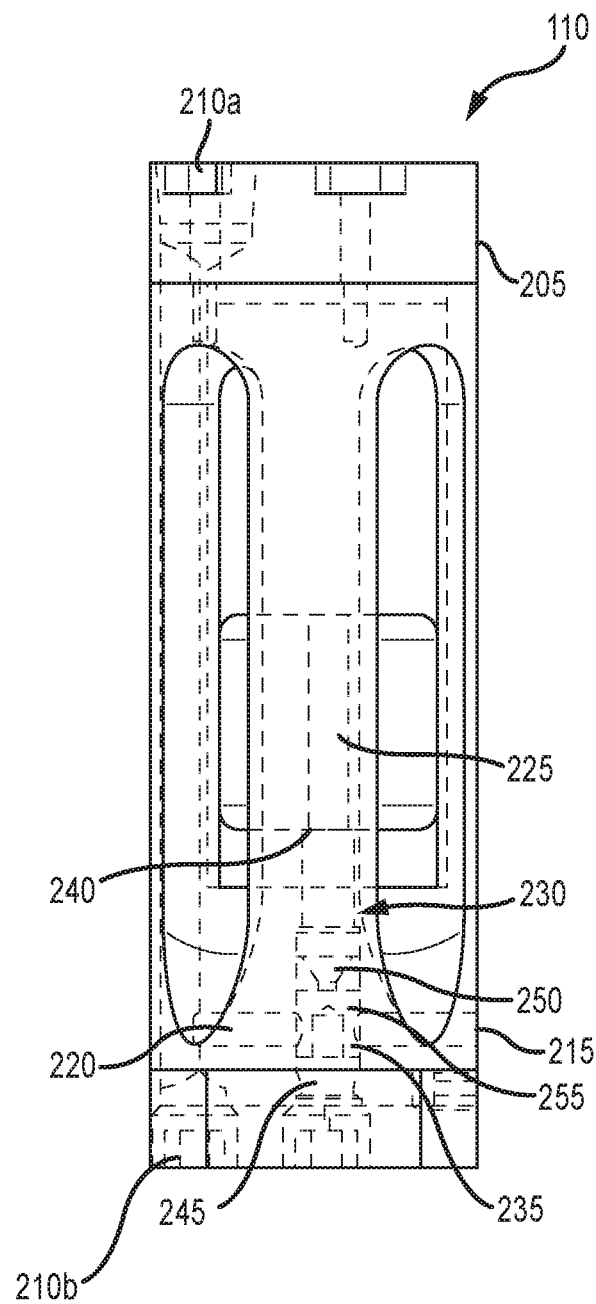
FIG. 3 shows a side elevation view of a float valve assembly in accordance with various aspects of the disclosure.

With reference now to FIGS. 2-4, a float valve assembly 110 is described according to various aspects of the disclosure. As mentioned above, the float valve assembly 110 may be positioned within a tank and regulate the level of fluid within the tank. In various examples, the float valve assembly 110 includes a housing 205 having a first inlet port 210-a and a second inlet port 210-b. Inlet port 210-a may be located at the top of the housing 205 and may be coupled with an inlet valve through a tube that runs external to the tank, for example. Similarly, inlet port 210-b may be located at the bottom of the housing 205 and may be coupled with the inlet valve through a tube that runs internally to the tank, for example. Depending upon which inlet port 210 is coupled with the tubing, the other inlet port 210 may be capped off. The housing 205 also includes and at least one outlet port 215, with the inlet port 210 and the outlet port 215 being fluidly connected via a channel 220 disposed within the housing 205.

Figure 4A:
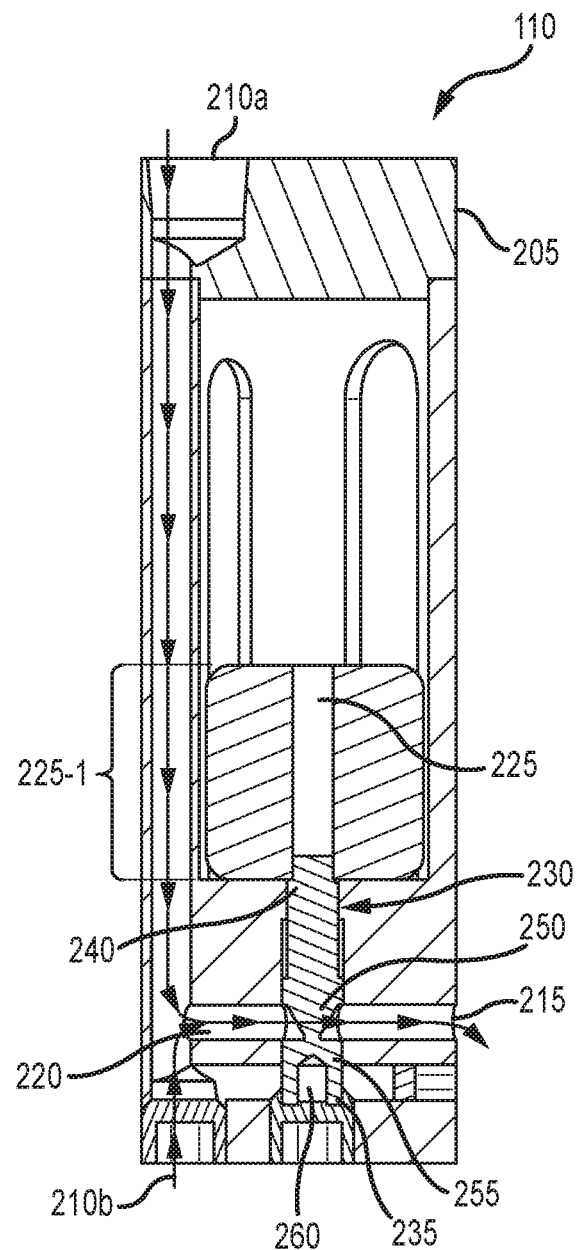
FIG. 4A shows a cross-section view of a float valve assembly with the float in a first position, in accordance with various aspects of the disclosure.
Figure 4B:
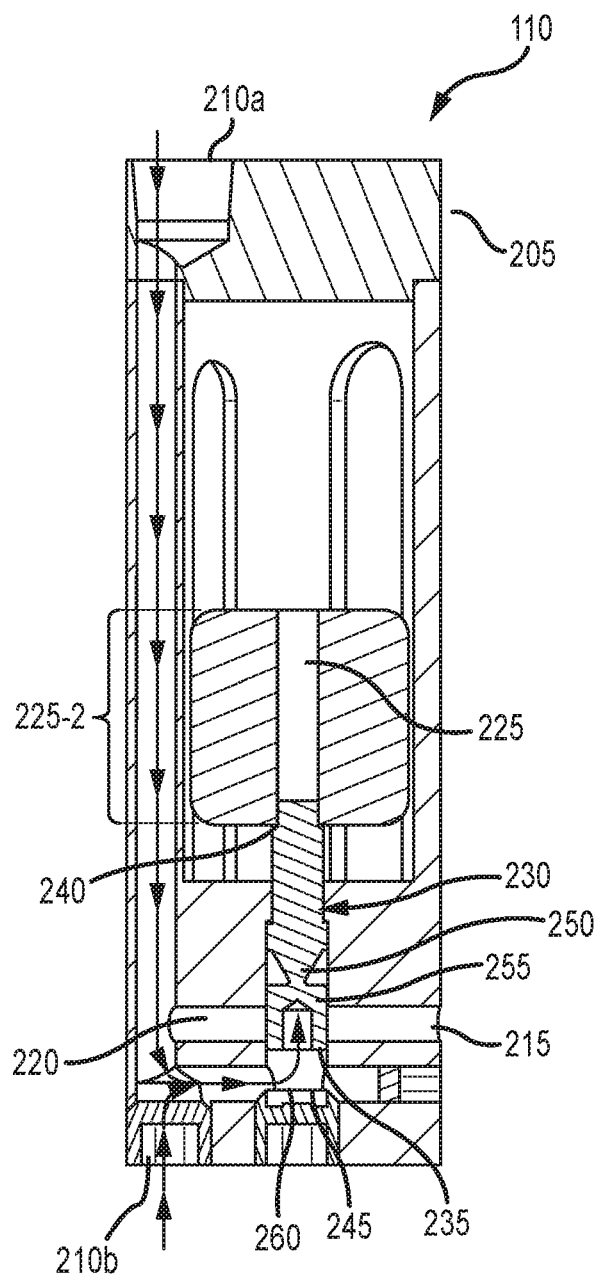
FIG. 4B shows a cross-section view of a float valve assembly with the float in a second position, in accordance with various aspects of the disclosure.

A float 225 is disposed within the housing 205 and configured to move relative to the housing between a first position 225-1 (shown in FIG. 4A) and a second position 225-2 (shown in FIG. 4B). The housing 205, as noted above, may be positioned such that the float 225 moves from the first position to the second position when the fuel in a tank reaches a preset level. A shaft 230 is connected to the float 225, and may include a distal end 235 and a proximal end 240. A chamber 245 is also located within the housing 205 that is fluidly connected to the channel 220 and receives the distal end 235 of the shaft 230 when the float 225 is in the first position 225-1.

In some examples, the shaft may include a reduced cross-section portion 250 located within the channel 220 between the outlet port 215 and the inlet port 210 when the float 225 is in the first position 225-1, thereby allowing fluid received at either inlet port 210 to exit the channel 220 via the outlet port 215, as indicated by the arrows in FIG. 4A. The shaft 230 may also include an increased cross-section portion 255 that increasingly obstructs the flow of fluid in the channel 220 as the float 225 moves from the first position 225-1 to the second position 225-2 such that the shaft 230 substantially obstructs the flow of fluid in the channel 220 when the float 225 is in the second position 225-2. The increased cross-section portion 255 may be located within the chamber 245 when the float 225 is in the first position 225-1 and moves out of the chamber 245 as the float 225 moves from the first position 225-1 to the second position 225-2 such that fluid from the channel 220 is allowed to enter the chamber 245. The fluid from the channel 220 that enters the chamber 245 provides a force to the distal end 235 of the shaft 230 to assist the float 225 in moving from the first position 225-1 to the second position 225-2. In some examples, a cavity 260 is formed within the distal end 235 to further allow fluid from the chamber 245 to bias the float 225 upward. Fluid entering the chamber 245 and applying pressure to the shaft 230 is indicated by the arrows in FIG. 4B.

As noted above, when one of the inlet ports 210 is coupled with a flow control valve, increased pressure at the inlet port when the float 225 moves from the first position 225-1 to the second position 225-2 may act to close a valve in the flow control valve and cut off the flow of fluid to the tank. In such a manner, a fueling system may automatically shut off when the fuel in the tank reaches a predetermined level.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A float valve apparatus for regulating the level of fluid within a tank, comprising:
    a housing comprising at least one inlet port and at least one outlet port, wherein the at least one inlet port and the at least one outlet port are fluidly connected via a channel disposed within the housing;
    a float disposed within the housing and configured to move relative to the housing between a first position and a second position;
    a shaft connected to the float comprising a distal end and a proximal end; and
    a chamber disposed within the housing fluidly connected to the channel and configured to receive the distal end of the shaft when the float is in the first position, wherein the presence of the distal end of the shaft in the chamber prevents fluid from entering the chamber from the channel when the float is in the first position, and wherein the chamber is further configured to receive fluid from the channel when the float is in the second position, wherein the chamber is configured to pressurize upon receiving fluid from the channel,
    wherein the proximal end of the shaft comprises a reduced cross-section portion located within the channel between the at least one outlet port and the at least one inlet port when the float is in the first position, thereby allowing fluid received at the one or more inlet port to exit the channel via the outlet port.

2. The apparatus of claim 1, wherein the distal end of the shaft comprises an increased cross-section portion that increasingly obstructs the flow of fluid in the channel as the float moves from the first position to the second position such that the distal end of the shaft substantially obstructs the flow of fluid in the channel when the float is in the second position.

3. The apparatus of claim 2, wherein the increased cross-section portion is located within the chamber when the float is in the first position and moves out of the chamber as the float moves from the first position to the second position such that fluid from the channel is allowed to enter the chamber.

4. The apparatus of claim 2, wherein the fluid from the channel that enters the chamber provides a force to the increased cross-section portion to assist the float in moving from the first position to the second position.

5. The apparatus of claim 1, wherein the housing comprises a first inlet port and a second inlet port, each fluidly connected with the channel.

6. The apparatus of claim 5, wherein the first inlet port is couplable with a flow control valve via a tube located exterior of the tank, and wherein the second inlet port is couplable with the flow control valve via a tube located within the tank.

7. The apparatus of claim 5, wherein the first inlet port is sealed when the second inlet port is fluidly coupled with a flow control valve, and the second inlet port is sealed when the first inlet port is fluidly coupled with the flow control valve.

8. The apparatus of claim 1, wherein the float moves from the first position to the second position when fluid within the tank reaches a predetermined level.

9. The apparatus of claim 1, wherein the at least one inlet port is configured to pressurize when the float moves from the first position to the second position, and thereby pressurize a tube coupled with a flow control valve to switch off a flow of fluid through the flow control valve.

10. A float valve apparatus for regulating the level of fluid within a tank, comprising:
a housing comprising a channel disposed within the housing, the channel comprising at least one inlet port and at least one outlet port;
a float disposed within the housing and configured to move relative to the housing between a first position and a second position in response to the level of fluid within the tank;
a shaft connected to the float comprising a distal end and a proximal end, and configured to intersect the channel and partially obstruct the flow of fluid in the channel when the float is in the first position; and
a chamber disposed within the housing fluidly connected to the channel and configured to receive the distal end of the shaft in the chamber such that fluid is prevented from entering the chamber from the channel when the float is in the first position, and wherein the chamber is further configured to receive fluid from the channel when the float is in the second position;
wherein the shaft is further configured to increasingly obstruct the flow of fluid in the channel as the float moves from the first position to the second position such that the shaft completely obstructs the flow of fluid in the channel when the float is in the second position.

11. The apparatus of claim 10, wherein the shaft comprises a reduced cross-section portion located within the channel when the float is in the first position, thereby allowing fluid received at the one or more inlet ports to exit the channel via the outlet port.

12. The apparatus of claim 11, wherein the shaft further comprises an increased cross-section portion that increasingly obstructs the flow of fluid in the channel as the float moves from the first position to the second position.

13. The apparatus of claim 12, wherein the increased cross-section portion is located within the chamber when the float is in the first position and moves out of the chamber as the float moves from the first position to the second position such that fluid from the channel is allowed to enter the chamber.

14. The apparatus of claim 12, wherein the fluid from the channel that enters the chamber provides a force to the increased cross-section portion to assist the float in moving from the first position to the second position.

15. The apparatus of claim 10, wherein the housing comprises a first inlet port and a second inlet port, each fluidly connected with the channel.

16. The apparatus of claim 15, wherein the first inlet port is couplable with a flow control valve via a tube located exterior of the tank, and wherein the second inlet port is couplable with the flow control valve via a tube located within the tank.

17. The apparatus of claim 15, wherein the first inlet port is sealed when the second inlet port is fluidly coupled with a flow control valve, and the second inlet port is sealed when the first inlet port is fluidly coupled with the flow control valve.

18. The apparatus of claim 10, wherein the at least one inlet port is configured to pressurize when the float moves from the first position to the second position, and thereby pressurize a tube coupled with a flow control valve to switch off a flow of fluid through the flow control valve.

\* \* \* \* \*